United States Patent
Crinon et al.

(10) Patent No.: US 8,031,222 B2
(45) Date of Patent: Oct. 4, 2011

(54) MULTIPLE RESOLUTION CAPTURE IN REAL TIME COMMUNICATIONS

(75) Inventors: Regis J. Crinon, Camas, WA (US); Jingyu Qiu, Issaquah, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 11/740,081

(22) Filed: Apr. 25, 2007

(65) Prior Publication Data

US 2008/0266411 A1 Oct. 30, 2008

(51) Int. Cl.
*H04N 7/14* (2006.01)
*H04N 5/235* (2006.01)

(52) U.S. Cl. .................. 348/14.12; 348/222.1

(58) Field of Classification Search ............... 348/14.12, 348/14.13, 143, 152, 155, 207.1, 219.1, 390.1, 348/423.1
See application file for complete search history.

(56) References Cited

U.S. PATENT DOCUMENTS

| | | | |
|---|---|---|---|
| 5,801,758 A | 9/1998 | Heirich | |
| 6,259,470 B1 | 7/2001 | Koizumi et al. | |
| 6,380,967 B1 | 4/2002 | Sacca | |
| 6,678,000 B1 * | 1/2004 | Sakata | 348/369 |
| 6,686,956 B1 * | 2/2004 | Prakash et al. | 348/218.1 |
| 6,788,347 B1 * | 9/2004 | Kim et al. | 348/441 |
| 7,054,904 B2 | 5/2006 | Ludwig et al. | |
| 7,119,829 B2 | 10/2006 | Leonard et al. | |
| 7,152,093 B2 | 12/2006 | Ludwig et al. | |
| 7,495,689 B2 * | 2/2009 | Curtis et al. | 348/207.1 |
| 2003/0052986 A1 * | 3/2003 | Matsumoto | 348/333.05 |
| 2003/0069752 A1 * | 4/2003 | LeDain et al. | 705/2 |
| 2004/0119814 A1 * | 6/2004 | Clisham et al. | 348/14.08 |
| 2004/0233282 A1 * | 11/2004 | Stavely et al. | 348/143 |
| 2004/0257431 A1 | 12/2004 | Girish et al. | |
| 2005/0104864 A1 | 5/2005 | Zhang et al. | |
| 2005/0213739 A1 | 9/2005 | Rodman et al. | |
| 2006/0268117 A1 * | 11/2006 | Loui et al. | 348/220.1 |
| 2007/0147820 A1 * | 6/2007 | Steinberg et al. | 396/155 |

OTHER PUBLICATIONS

Chiu, et al., NoteLook: taking notes in meetings with digital video and ink, http://delivery.acm.org/10.1145/320000/319483/p149-chiu.pdf?key1=319483&key2=0531412711&coll=GUIDE&dl=GUIDE&CFID=15015622&CFTOKEN=28553473, 1999, ACM Press, New York, NY, USA, 10 pages.

Adam, et al., The Vidboard: a video capture and processing peripheral for a distributed multimedia system, http://portal.acm.org/ft_gateway.cfm?id=166279&type=ps&coll=GUIDE&dI=GUIDE&CFID=15015622&CFTOKEN=28553473, MIT Laboratory for Computer Science, 8 pages, 1993.

Zhang, et al., A Mobile Teleconference System for Homecare Services, http://ieeexplore.ieee.org/xpl/freeabs_all.jsp?arnumber=1615322, Sep. 2005, 4 pages The University of Aizu, Aizu-Wakamatsu, Fukushima-ken 965-8580, Japan.

Srinivas, et al., MONET: A Multi-media System for Conferencing and Application Sharing in Distributed Systems, http://www.cerc.wvu.edu/cercdocs/techReports/1991/cerc-tr-rn-91-009.pdf, Feb. 1992, 19 pages, Concurrent Engineering Research Center West Virginia University, Morgantown West Virginia, USA.

* cited by examiner

*Primary Examiner* — Nicholas Giles

(57) ABSTRACT

During remote communication session, there can be situations where information needs to be sent at a high resolution. Sending information at a high resolution allows for the capture of detail that can be lost without the use of a high resolution. A web camera can obtain information in both a higher resolution and standard resolution. A sending component can send this information encoded with markers that allow a receiving component to process and display the information.

12 Claims, 14 Drawing Sheets

┌─ 300

| 302 | 304 | 306 | 308 | 310 | 312 |
|---|---|---|---|---|---|
| REGULAR INFORMATION PIECE | PHOTOGRAPH INDICATION MARKER | CHANGE RESOLUTION START MARKER | CHANGE RESOLUTION INFORMATION PIECE | CHANGE RESOLUTION END MARKER | REGULAR INFORMATION PIECE |

MULTIPLE RESOLUTION CAPTURE IN REAL TIME COMMUNICATIONS

TECHNICAL FIELD

The subject specification relates generally to information capture and in particular to video and photograph capturing in real time communications.

BACKGROUND

Developments in communication technology have changed common protocol for business. There is less in-person communication as people communicate through alternative mediums. For example, electronic mail (e-mail) allows individuals to communicate virtually instantaneously. Real time communications allow individuals to communicate as if they were together even if they are not physically in the same location. For example, employees can communicate though an instant messenger service without ever leaving their desk or personal computer.

One area that has changed due to real time communication developments is business meetings. There are many instances where individuals no longer need to travel all over the world to collaborate on an idea. Software and hardware allow individuals to communicate with one another in real time from remote locations. For example, engineers in Canada, England, India, and Hong Kong can communicate with each other without having to leave their respective nations. A number of benefits occur from this type of communication. Costs can be vastly reduced since there is not physical travel and no incurring of expenses like flights or hotels. In addition, participants can have direct access to local resources (e.g., an employee's personal files) that allow them to begin work immediately at a high efficiency level. Furthermore, problems originating from international travel (e.g., passports, security clearance) are reduced.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Digital communication technology does not allow for capture of high-resolution images during a real time correspondence. The subject specification discloses information for capture of high-resolution images during real time communication. An encoder has several modes in which to capture images for different purposes and formats. Information can be transmitted at different resolution levels during the same communication session. A specially captured image travels to a receiver with specific information to identify that a communicated image is a specially captured image.

In particular, claimed aspects described herein provide for conducting a webcam session and allow the webcam session to be conducted at a relatively low resolution in order to optimize an amount of date conveyed during the session. However, oftentimes individuals in the session want to capture and send an image to the other end in high-resolution. The session can be mitigated to capture an image at high-resolution. Devoting a higher amount of resources during a brief period of time allows for a high-resolution capture without extensive problems in the session. Typically, webcam sessions have a low bandwidth meaning there is only a limited amount of information that can pass at a single time. If there is an attempt to pass more information then bandwidth allows, then there can be partial breakdown of the session (e.g., choppiness of a transferred sound). Therefore, the subject specification disclosed information for allocating resource for a high-resolution capture for only a limited period of time. Once the high-resolution capture completes, there can be a return to a lower level of resolution.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
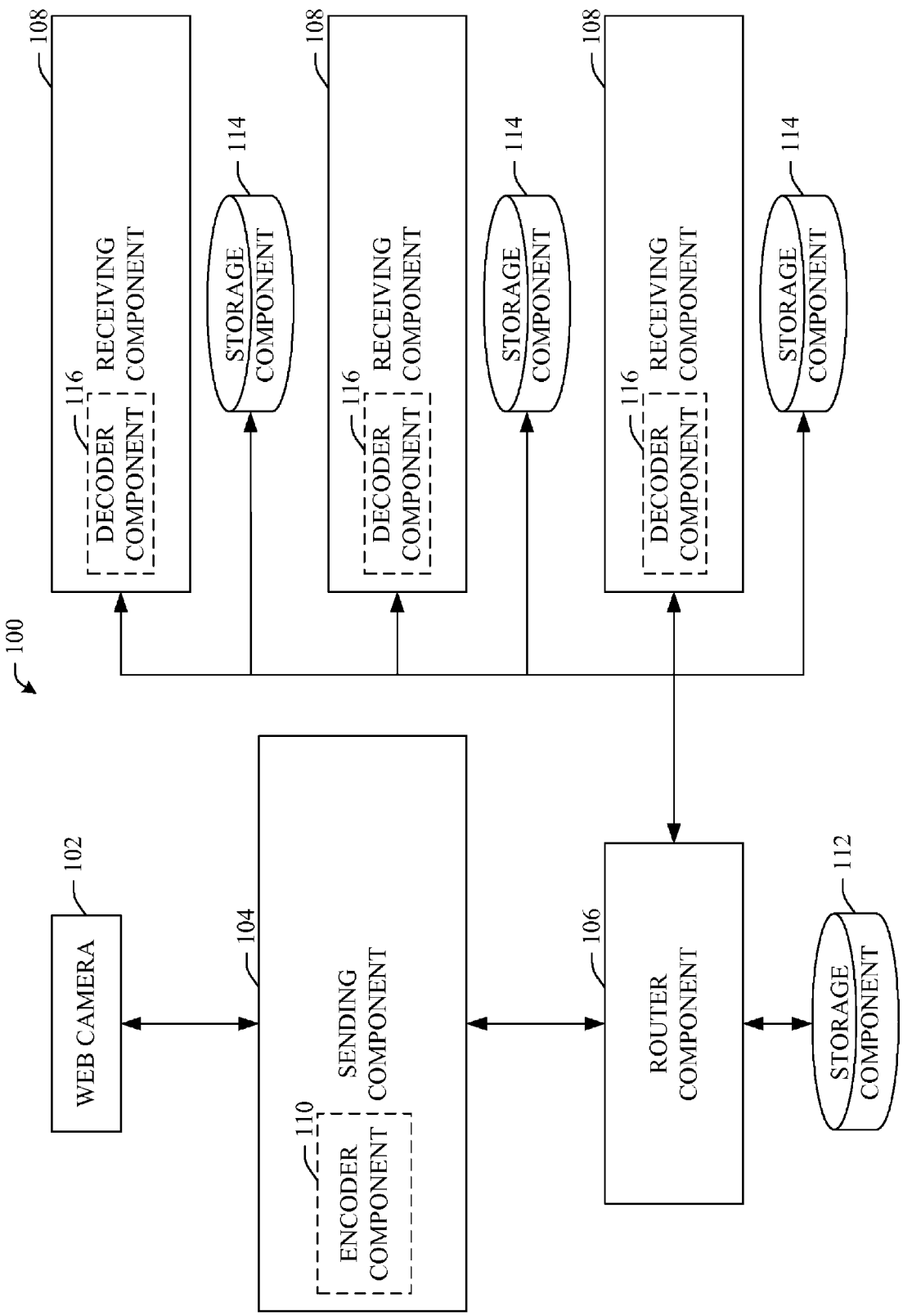
FIG. 1 illustrates a representative communication system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

During a common communication session, resolution is kept at a relatively low level to minimize communication breakdown (e.g., noticeable break-ups in communication flow) or simply to accommodate other types of traffic (e.g., downloads, uploads, etc.) that can occur on a common transmission network. However, there are situations where individuals participating in the session desire to communicate information at a higher resolution. Specific details can be missed at lower resolutions, which can be undesirable in particular situations (e.g., background noises can be missed with communicating at lower resolutions). Allowing for a resolution change during a communication session can protect both interests of limiting communicating breakdown and capturing necessary details.

For example, a communication session can take place at a relatively lower resolution level. The resolution can be changed to a higher level in order to capture more detail when necessary. The change in resolution dedicates more system resources (e.g., CPU cycles to encode the higher resolution video, higher bitrate to transmit the higher resolution video, etc.) to capturing details. Once necessary information is captured at a high-resolution, the communication session can resume the lower resolution level. This allows for an optimization of the communication session.

FIG. 1 discloses an example communication system 100. A web camera 102 perceives information and sends the information to a sending component 104. The information can be anything perceived, including visual information and/or audio information. The subject specification relates to perception of information. In many parts of the specification, there is reference to visual capture (e.g., image capture). It is to be appreciated that references to visual capture in the subject specification are for example purposes and disclosed information can relate to other perceptions (e.g., perceiving audio sounds).

The web camera 102 can have multiple settings including a standard resolution mode and a high-resolution mode. It is to be appreciated that the web camera can capture any information capable of perception (e.g., infrared information). This includes perception of visual information as well as audio information. A configuration of the web camera 102 can have multiple resolution settings, including multiple high-resolution settings. These high-resolution settings can be multi-dimensional (e.g., can capture greater visual resolution and greater audio resolution at the same time). A web camera 102 can be a webcam; however, there are other possible embodiments. For example, the web camera 102 can be a computer display touchpad a user is writing onto by hand with a stylus that can be transmitted at different resolutions. Furthermore, the web camera can be a microphone with no optical capabilities. According to one embodiment, the web camera can take a single high-resolution frame shot (e.g., still picture) or a small sequence of contiguous high resolution frames, and automatically returns to a standard resolution mode.

A sending component 104 prepares images for transmission to a router component 106 and ultimately to a receiving component 108. A common sending component 104 is a personal computer used by an individual user; a common router component 106 is an Audio/Video Multi-point Control Unit or AVMCU. A user can engage a sending component 104 to enable the web camera 102 to capture different images at different resolutions. A common component of a sending component 104 is an encoder component 110. The encoder component 110 allows for compression of information (e.g., a standard resolution image or a high-resolution image) as well as creation of transferable information. According to one embodiment, the sending component 104 sends a continuous stream of information (e.g., a bitstream) to a router component 106 or a receiving component 108. An encoder component 110 compresses information to allow for improved performance in real time communications. Information commonly travels in an encoded (e.g., compressed) format that can include specific security features (e.g., compressed encryption).

The information can travel to a router component 106 that couples to a storage component 112. The router component 106 allows for transferring information to at least one receiving component 108 (e.g., another participant in a video conference). It is possible for the communication system 100 to function without a router component 106 and communicate directly with at least one receiving component 108. An example of a communication system 100 that would not use a router component 106 is a peer-to-peer environment. The router component 106, and thus the communication system 100, can function in a closed environment (e.g., an internal business infrastructure) or an open environment (e.g., Internet communication system).

Coupled to the router component 106 is commonly a storage component 112. The router component 106 can configure to be able to determine when it is processing a high-resolution image. There are instances where it can be beneficial for a router component 106 to store the high-resolution image. For example, there may be a slight interrupt in communications between the router component 106 and a receiving component 108. If a successful communication cannot take place, the router component 106 can place the high-resolution image in the storage component 112. In another embodiment, the router component 106 can back up all high-resolution images it receives by placing the high-resolution images in the storage component 112.

Disclosed are three receiving components 108 with corresponding storage components 114. However, any number of receiving component(s) 108 and storage component(s) 114 can be practiced, including uneven amounts (e.g., four receiving components 108 and one storage component 114). In addition, storage components 114 can integrate with the receiving components 108 or integrate into the storage component 112. Each receiving component 108 can receive information from the router component 106 and/or the sending component 104 and decode (e.g., decompress) the information thought a decoder component 116. An example of a receiving component 108 is a laptop computer.

In one embodiment, the receiving component 108 decodes the transmitted information in real time during normal operation. Incoming high-resolution information is received and stored automatically. This can be done in a pre-designated folder and then a notice can be sent to the receiving component 108 that there is a save of a high-resolution capture. In another embodiment, a receiving user has an option to turn an auto-save feature 'on' or 'off'.

While FIG. 1 shows the router component 106 communicating with the storage component 114, it is possible that the receiving component 108 communicate with the storage component 114 and not the router component 106. In addition, the receiving component 108 can communicate with the storage component 114 through the decoder component 116. This allows the storage component 114 to hold decoded information.

It is to be appreciated that while the disclosed system is configured for a live conferencing environment, there can be other configurations using disclosed information. For example, there could be no live conferencing and the sending component sends an electronic mail message. The receiving component could receive that message without use of live conferencing. Furthermore, there can be instances where a user cannot participate in real time video communication. A user can use the web camera to capture an image of a logo in high definition and that can be displayed to a receiving component as opposed to the live video feed. For example, a user can hold up a logo and capture the logo in high resolution.

The following is an example of an implementation of the communication system 100. Any identification is used for example purposed and not intended to limit the scope of any component or feature of the subject specification. For example, a reference to 'laptop computer 108' should not be limited the receiving component 108 to a laptop computer. A user sends information in real time using a webcam 102 integrated with a personal computer 104. In common operation, the webcam 102 functions at a normal resolution (e.g., VGA—640 pixels by 480 pixels). However, the user wants to send an image to another user on a laptop computer 108 of a document. In order for the user on the laptop computer 108 to appreciate details of the document it should be transmitted at a higher resolution.

The user instructs the webcam 102 to capture images at a higher resolution (e.g., HUXGA—6400 pixels by 4800 pixels). The webcam then captures images at the higher resolution. Typically, the user holds up the document for capturing. An encoder 110 of the personal computer 104 prepares captured images for transportation. The captured image travels to a video router 106 that saves a copy of the captured image in storage 112. The video router 106 sends the captured image to the laptop computer 108 that decodes the captured image with a decoder 116. Commonly, the captured image is saved in storage 114. It is to be appreciated that while the subject specification discusses selecting a higher resolution, information can configure to display information at a lower resolution.

Figure 2:
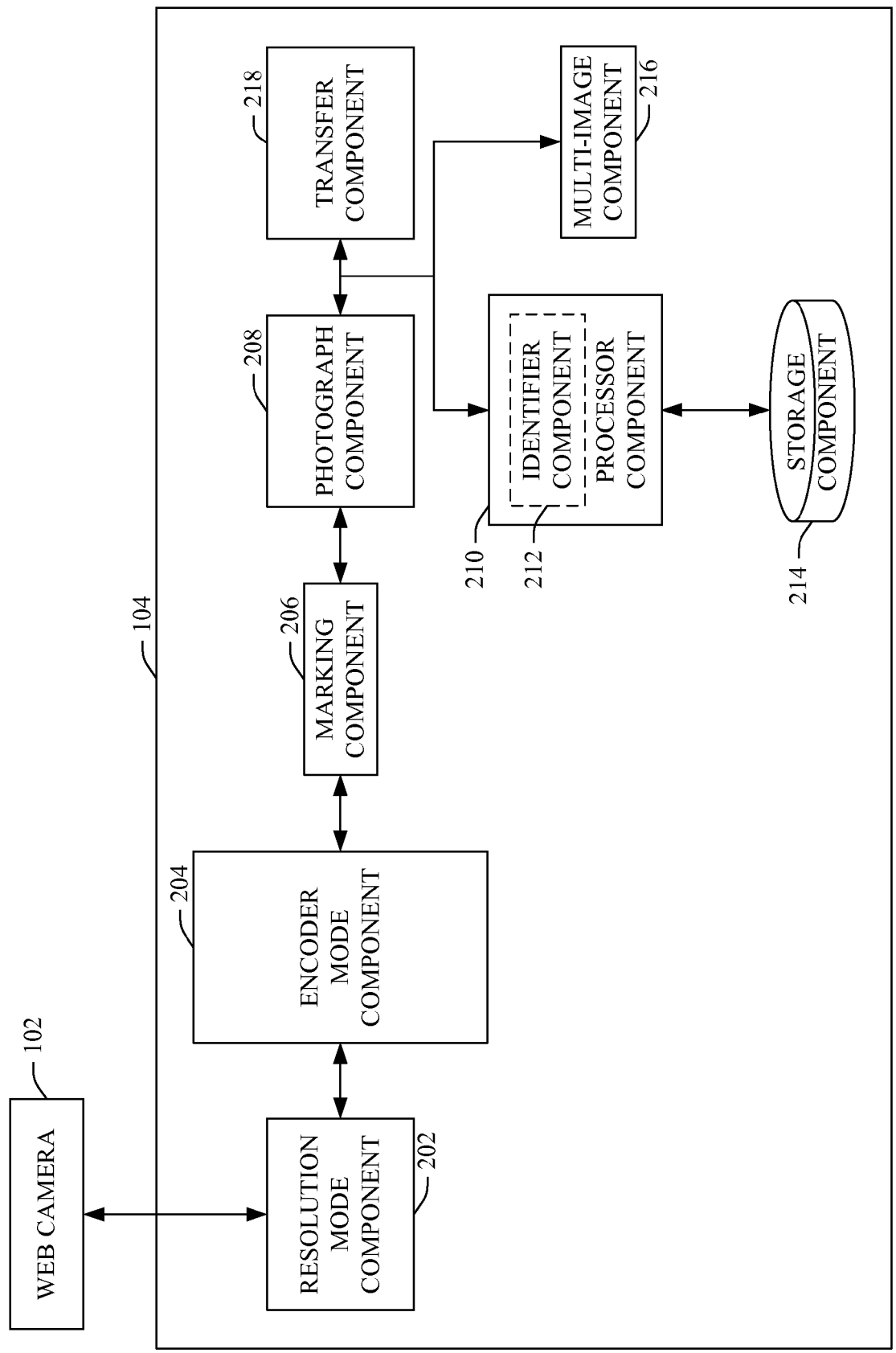
FIG. 2 illustrates a representative sending component in accordance with an aspect of the subject specification.

FIG. 2 discloses an example web camera 102 and sending component 104. A resolution mode component 202 allows for specific settings in capture applicable to a web camera 102 (e.g., a webcam). There is commonly an initial option to select a capture session (e.g., video, fax, photograph, etc.) to take place. There can be a variety of capture modes available with the sending component 104. The resolution mode component 202 can change level of resolution capture of the web camera during a communication session. The level or resolution capture can change for audio capture (e.g., increase perception of sounds), the level or resolution capture can change for visual capture (e.g., increase the amount of optical detail captured), as well as others (e.g., detection of atmospheric pressure). Furthermore, there can be multiple resolution changes at one time (e.g., increase in audio resolution as well as increase in visual resolution at the same time).

In one embodiment, a web camera 102 can use multiple resolution formats, including formats with a high spatial resolution mode (e.g., a resolution mode with a slower frame rate). These formats allow for capturing high video quality of still images (e.g., documents) and/or animations. While much of the subject specification relates to capturing an image at a resolution that is higher then a standard resolution, it is to appreciated that information disclosed can relate to a lower then standard resolution.

The resolution mode component 202 can operate manually (e.g., through user manipulation) or automatically. In automated image capture, a system (e.g., web camera 102 and a sending component 104) or component (e.g., web camera 102) can recognize when a web camera 102 perceives an image that can benefit from a display in a high-resolution. For example, a user holds a document up to a web camera 102. The web camera 102 recognizes that it is capturing a document and that a capture of the document can benefit from a higher resolution capture.

Therefore, the web camera 102 can automatically capture the document at a higher resolution. Once complete, the web camera 102 can re-enter a normal resolution mode. For example, the resolution mode component can enable the web camera to capture information initially in a first resolution quality, change to capture information in a second resolution quality, and then return to capture information in the first resolution quality. This can be automatic or manual and it does not have to be dependent on the selection for entering a high-resolution mode. For example, if a high-resolution mode is entered automatically, it can be exited manually. In another embodiment, there can be an automatic determination for a time when a standard resolution mode can resume (e.g., after a five-second high-resolution capture, there is a return to standard resolution). The resolution mode component can automatically switch resolution quality for the web camera to obtain information.

In another embodiment, the resolution mode component 202 can configure with an option for a partial high-resolution capability. This allows a single capture to have different resolution properties. For example, a web camera 102 can have a document presented in 60% of a capture area and background in 40% of the capture area. The document portion can be captured in high-resolution while the background can be captured in standard resolution.

Once captured, information is passed to an encoder mode component 204. The encoder mode component 204 compresses information for transport to a receiving component 108 of FIG. 1. Compression allows for communication that is more efficient. The encoder mode component 204 can configure to attempt to compress all captured information to the same size or have different sizes dependent on the resolution. The encoder component 110 of FIG. 1 can be the same as the encoder mode component 204, a combination of the encoder mode component 204 and a marking component 206, as well as other configurations. In another embodiment, the web camera 102 communicates captured information directly to the encoder mode component 204 as opposed to through the resolution mode component 202.

Furthermore, the encoder mode component 204 can be set to produce a high quality production of captured information. For example, the encoder mode component 204 can attempt to ensure a high quality image production for high-resolution visual capture. There can be a check performed be the encoder mode component 204 to make sure there are no errors in capturing (e.g., ensure there is production quality of information that is corresponding to that of what was intended to be captured and/or what the web camera can capture). The encoder mode component 204 can convert captured information into digital information that can be transmitted in order to ensure there is an appropriate quality level of production.

A marking component 206 adds markers to a bitstream of capture information to notify the receiving component 108 of FIG. 1 as to the resolution of received information. The marking component adds marks after a portion of a bitstream with information that is captured in a first resolution quality to signify at least a beginning of information that is captured in a second resolution quality. Information travels from the sending component 104 as a bitstream that provides the receiving component 108 of FIG. 1 with near continuous or continuous information in which to update a visual display. Added marks are commonly at each end of high-resolution information in a compressed bitstream. There is a beginning mark and an end mark so it can be determined where there is a start and a finish of a high-resolution capture.

In addition, the sending component 104 can increase security in regards to communication. This can be done in various manners. In one embodiment, the encoder mode component 204 encrypts compressed information. Once encrypted, the marking component 206 inserts security information (e.g., information on how to decrypt) into the bitstream. In another embodiment, the encoder mode component 204 encrypts information and a receiving component 108 of FIG. 1 possesses information on how to decrypt information.

A photograph component 208 can specifically integrate with taking a photograph of an individual sending information. In one embodiment of the subject specification, a sender can take a high-resolution photograph of himself or herself. The photograph component 208 adds information to the bitstream that the high-resolution image is designed to be an identification photograph. The photograph component 208 associates information captured by the web camera with an identifier. When the information reaches a receiving component 108 of FIG. 1, the high-resolution photograph can be used for identification purposes. Furthermore, the information can be used for identification purposes prior to a transfer (e.g., used on a display component of the sending component). For example, the high-resolution photograph can be placed next to an individuals name on a teleconferencing prompt. In another embodiment, the photograph is not of a person, but of a symbol on a document.

Furthermore, the sending component 104 can have a processor component 210 that performs other processing on the information. The processor component 210 can add other information to the bitstream prior to transfer from the sending component 104. Furthermore, the processor component 210 can display captured images to a display component integrated with the sending component. The processor component 210 performs analysis to determine characteristics of captured information.

An identifier component 212 can launch a mode at the start of a communication session to obtain associated information. For example, the identifier component 212 can instruct the resolution mode component 202 to begin a session in a higher resolution for utilizing the photograph component 208. An image is captured and the photograph component 208 associates information captured by the web camera with an identifier (e.g., a person's name).

There can be a storage component 214 within the sending component 104 and information sent can be backed up locally. In addition, other information concerning the sending component 104 can be saved in the storage component 214. The sending component 104 can access other storage components for saving captured information as well as the internal storage component 214. The other storage components can be dedicated to the sending component 104 or shared with other components. For example, the sending component 104 could engage with the storage component 112 of FIG. 1. When engaging the storage component 112 of FIG. 1, there can be a creation of an intelligent record of information captured by the web camera 102. This can be done by the processor component 210. For example, the web camera 102 can take a five second video image of a document held up to its field of vision. The processor component 210 can identify that this is a high-resolution image of a document. A single file can be created and saved not as a video, but as a document file (e.g., a '.doc' file).

A multi-image component 216 can combine image information to present a more accurate and/or higher resolution image. This creates super-resolution images from information captured by the web camera 102. For example, there can be slight movements from the web camera 102. These movements allow for a more detailed capture of a general area, specifically of the area at the edge of what is perceived by the web camera 102.

The multi-image component 216 can process different frames of an image capture and integrate captured information into other displays. This allows for data to be received by the receiving component 108 in a super-resolution format. The multi-image component processes information captured by the web camera to allow for super-resolution. A transfer component 218 emits information captured by the web camera 102. The transfer component 218 emits information captured by the web camera as a bitstream from the sending component 104 for further processing. Furthermore, the transfer component 218 can transmit information capture during a communication session at a first resolution level and transmit additional captured information at a second resolution level during the communication session.

Figure 3:
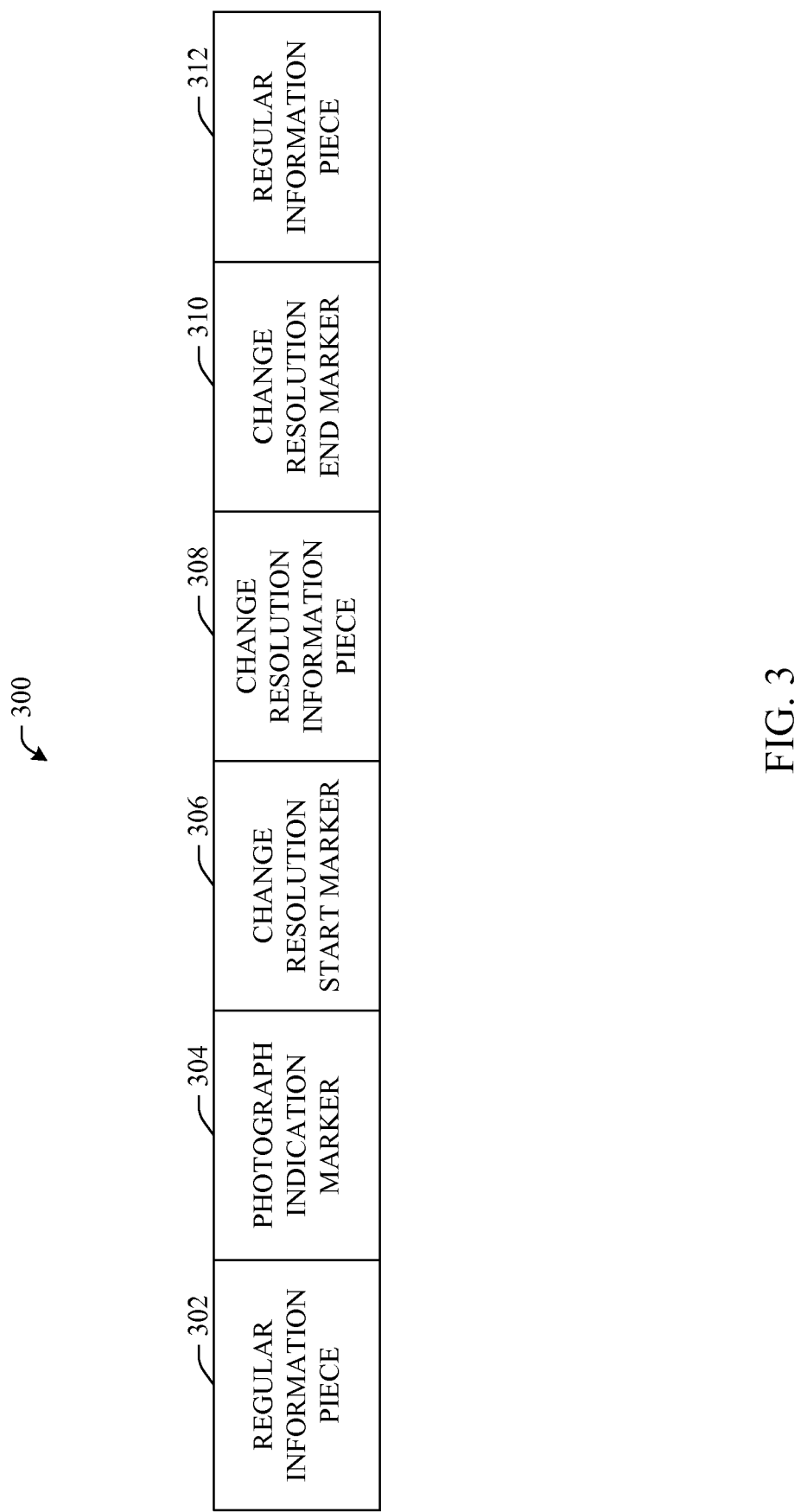
FIG. 3 illustrates a representative bitstream in accordance with an aspect of the subject specification.

FIG. 3 discloses an example bitstream that travels from the sending component 104 of FIG. 1 ultimately to a receiving component 108 of FIG. 1. A regular information piece 302 represents information in the bitstream 300 that has a standard resolution. A photo indication marker 304 indicates that the next segment of the bitstream represents a photograph that is to be used in a teleconferencing prompt. If a photograph is at a different resolution then the regular information piece 302, then there is a change resolution start marker 306. Commonly, the change resolution start marker 306 indicates that the resolution will be at a higher quality then the resolution of a regular information piece. However, it is possible that the resolution quality will be lower for an identification photograph or any other resolution change.

A change resolution information piece 308 is information that is at a different resolution then the regular information piece 302. At an end of the change resolution information piece there is a change resolution end marker 310. This signifies that the specific resolution information is ended. Commonly, after a change resolution end marker 310 there is a regular information piece 312 that is of the same resolution as the regular information piece 302.

Different configurations of the bitstream 300 are possible. For example, the photograph indication maker 304 and the change resolution start marker 306 can be a single block publishing the new horizontal and vertical dimensions of a higher resolution video frame. In another possible configuration, the change resolution information piece 308 and the change resolution end marker 310 can be a single block where a new horizontal and vertical dimension of the standard definition video are published.

There are other embodiments available for a bitstream 300. In one embodiment, the bitstream 300 can have check markers to enable a receiving component to confirm that information is processes at a correct resolution. In another embodiment, the bitstream 300 includes encryption information. Encryption information can arise in many different forms. In one example, the bitstream 300 can have encrypted information that a receiving component deciphers to read and display information. In another example, the bitstream 300 can have encrypted information as well as information on how to decrypt the information. A receiving component can process the decryption information in order to process the bitstream 300.

While the bitstream 300 is shown as continuous, it is possible for there to be natural interrupts in the bitstream 300. While this can be considered at technically multiple bitstreams, for the purposes of the subject specification, a bitstream 300 can refer to both a continuous bitstream and multiple bitstreams during the same communication session that have natural spaces and interrupts.

Figure 4:
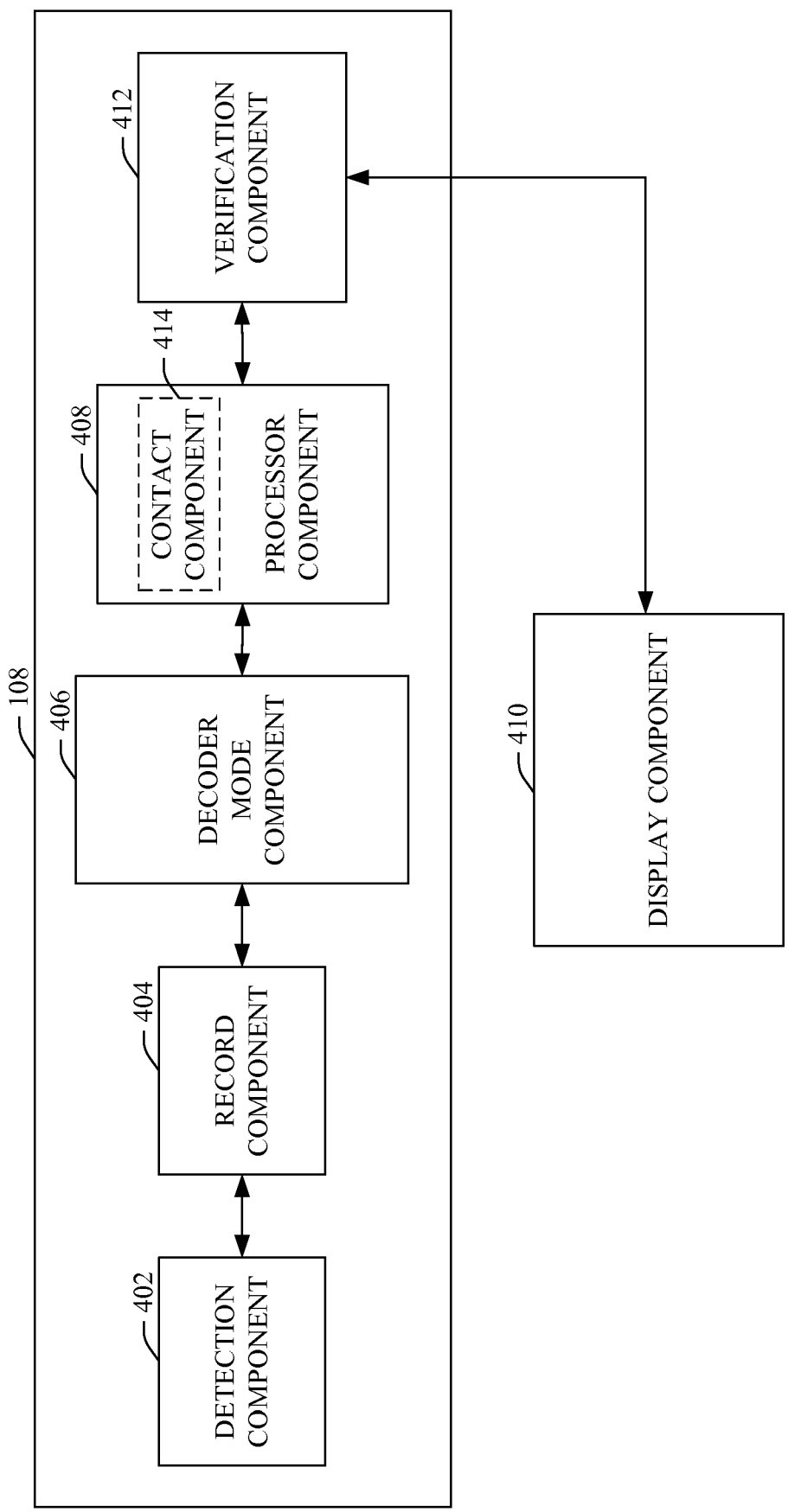
FIG. 4 illustrates a representative receiving component in accordance with an aspect of the subject specification.

FIG. 4 discloses an example receiving component 108. A detection component 402 can identify resolution level of received information. For example, the detection component 402 can read information from a bitstream 300 of FIG. 1. The resolution of a regular information piece 302 of FIG. 3 and a change resolution start marker 306 of FIG. 3, as well as other information can be identified by the detection component 402.

A record component 404 stores received information when the received information is at a specified resolution level. For example, information can enter the receiving component 104 at 320×240. However, a copy of received information is not stored unless the information is above a level of 640×480 or higher. In this example, the specified resolution is a resolution above the level of 640×480. If received information changes to 800×600, then a copy of received information is stored, since it is above a threshold level of 640×480. Therefore the specified resolution level is any resolution within an open-ended resolution level range (e.g., resolution levels above level 'X', resolution levels below level 'Y').

Creating a copy of received information and storing a copy of the received information is the same as storing received information. However, storing received information can also be storing a non-copy of the received information. Other components in the receiving component 108 can operate off stored information.

A record component 404 can make a replica of information contained in a bitstream 300 of FIG. 3 that enters the receiving component. The replica can be stored in a storage component 114 of FIG. 1. While the record component 404 is shown as functioning after the detection component, the record component 404 could follow other components of the receiver component 108. For example, the record component 404 can operate after a decoder mode component 406. Therefore, a decoded copy of information can be made and stored in the storage component 114 of FIG. 1.

A decoder mode component 406 decompresses received information. This performs the opposite action performed by the encoder more component 204 of FIG. 2. The decoder mode component 406 can have the capability of checking accuracy of performed decoding. For example, a received bitstream can have information relating to the size a decompressed high-resolution file.

The record component 404 and decoder mode component 406 can operate together in multiple manners. According to one embodiment, the record component creates a separate file for received bitstreams in the storage component 114 of FIG. 1 automatically. The record component 404 then transfers the bitstream to the decoder mode component 406. As the decoder mode component 406 decompresses information, the record component 404 makes a copy of the file and saves it the storage component 114 of FIG. 1.

For example, a bitstream enters the receiving component 108 and a bitstream begins with standard resolution information. The record component 404 creates a file folder for the bitstream and sends information to the decoder mode component 406. The decoder mode component 406 decompresses the information. The record component creates a file for the standard resolution in compressed or decompressed format. The record component 404 can identify a high-resolution marker in the bitstream and create a separate file for high-resolution information. If there is a marker signifying an end to high-resolution information and a return to standard resolution information, then the record component 404 can create a new file for the standard resolution information or link the information with an original file of the standard resolution.

A processor component 408 performs actions upon decompressed information. For example, the processor component 408 can hold the information to assure that it is supplied to a display component 410 as an equal stream (e.g., supplied so there are few or no gaps or lags in displayed video). The processor component 408 performs analysis to determine characteristics of captured information. For example, the processor component 408 can determine if there is a specific format in which information should be displayed (e.g., black and white). Furthermore, the processor component 408 can determine if information has special characteristics through analysis. For example, high-resolution information can be sent to be added as part of a signature portion of a display. The processor component 408 can identify this intention and take actions to ensure its completion.

In another embodiment, the processor component 408 performs intelligent maintenance upon information saved in the storage component 114 of FIG. 1. For example, the record component 404 can create a file copy of high-resolution information originating from when a user held a document up to a web camera 102 of FIG. 1. Information commonly enters the receiving component as video. However, high-resolution information can be used to show a document. The processor component 408 can change the file from a video of a displayed document to a document format (e.g., portable document format) through intelligent analysis of information stored in the storage component 114 of FIG. 1.

A verification component 412 can check information for accuracy and/or validity. For example, information can enter the receiving component 108 that should be displayed in high-resolution. However, the information is processed to display in standard resolution. The verification component 412 can determine this error and attempt to correct the error. In another embodiment, the verification component 412 can check properties of the display component 410. For example, high-resolution information is intended to be displayed at 'X' resolution. However, the display component 410 can only display information at 'Y' resolution, where 'Y' resolution is an inferior resolution to 'X' resolution. The verification component 412 can adjust information to allow it to display at the highest resolution possible within capabilities of the display component 410. For example, the verification component 412 can attempt to display information in an optimal resolution. For example, if information cannot be displayed at the highest resolution, the verification component 412 can allow for displaying information at a highest resolution possible.

Ultimately, information is presented on a display component 410. According to one embodiment, displaying the higher resolution frame is done after a receiving user has been notified that there is such high-resolution information available for perception and he/she has accepted. Likewise, a receiving user can see the higher resolution when he/she has configured his/her system to execute the presentment of such higher resolution information. For example, the display component 410 can be a monitor with a visual display. However, there can be other embodiments for the display component 410. For example, the display component 410 can be a printer that creates images based on a video feed. The printer can produce images that are both standard resolution and high-resolution. In a further embodiment, the display component 410 can integrate into the receiving component 108.

This display component 410 can also function outside of visual presentment. For example, the display component can be a set of speakers. Furthermore, the display component 410 can convert display types. For example, information perceived as sound can be presented as text (e.g., text can be transcribed in the processor component 408). The display component 410 can display information in two different resolution levels (e.g., a lower resolution level and a higher resolution level). In another embodiment, the display component 410 presents information in two different resolution levels of two different types (e.g., one audio resolution and one visual resolution).

There can be a contact component 414 that stores received information associated with an identifier. For example, the processor component 408 identifies that a high-resolution image was received that is to be used for identification purposes (e.g., for display next a name of a participant). The contact component 414 can create a record of the image as well as identification information (e.g., what person the image associates). In a later communication session, the same identifier can be used for a person without a need to recapture a high-resolution image. While shown as part of the processor component 408, the contact component 414 can operate alone or in conjunction with other components.

Figure 5A:
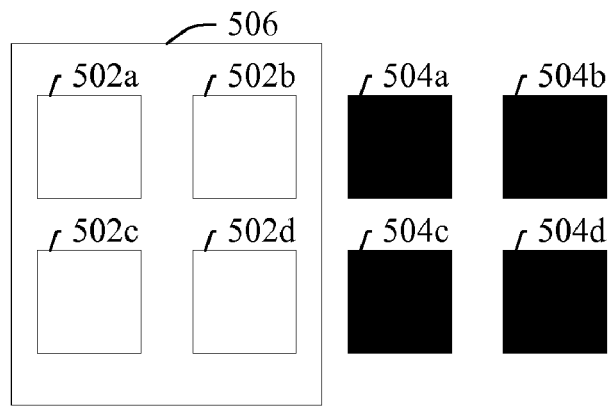
FIG. 5a illustrates a representative pixel capture in accordance with an aspect of the subject specification.
Figure 5B:
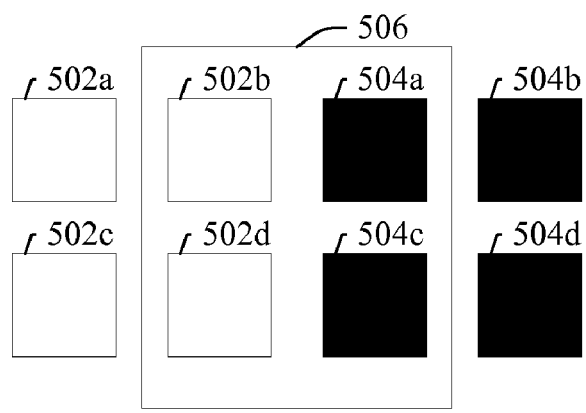
FIG. 5b illustrates a representative pixel capture in accordance with an aspect of the subject specification.
Figure 5C:
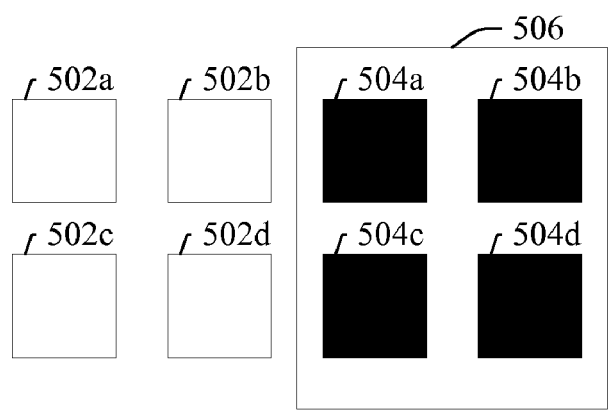
FIG. 5c illustrates a representative pixel capture in accordance with an aspect of the subject specification.

FIG. 5a to FIG. 5c discloses example multi-image captures. These multi-image captures can be processed by the multi-image component 216 of FIG. 2. The figures display eight points: four white points 502a-d and four black points 504a-d. A pixel 506 of a web camera 102 of FIG. 1 can contain four points at one time. FIG. 5a discloses a first frame where the web camera 102 of FIG. 1 captures the four white points 502a-d. The receiving component would not know information concerning what is to the right of the area capture, so white would be displayed to a user.

After a slight movement for the web camera 102 of FIG. 1, FIG. 5b discloses that the web camera 102 of FIG. 1 now captures two white points 502b and 502d as well as two black points 504a and 504c with the pixel 506. Now it is known that the white points border black points. Therefore, the multi-image component 216 of FIG. 2 can create a more accurate image. For example, since it is known that two white points and two black points border each other, a gray may be a proper color for representation.

If the movement continues, the web camera 102 of FIG. 1 can capture further right, which is shown by FIG. 5c. The pixel 506 captures that there is a pixel of information that is black since the pixel captures four black points 504a-d. Therefore, the multi-mage component 216 of FIG. 2 can produce information that white is next to black. This can allow for a more detailed image, producing a type of super-resolution. Super-resolution is a resolution that includes details that is greater then can be taken in a single frame (e.g., there should be at least two frames that do not capture the same information).

Figure 6:
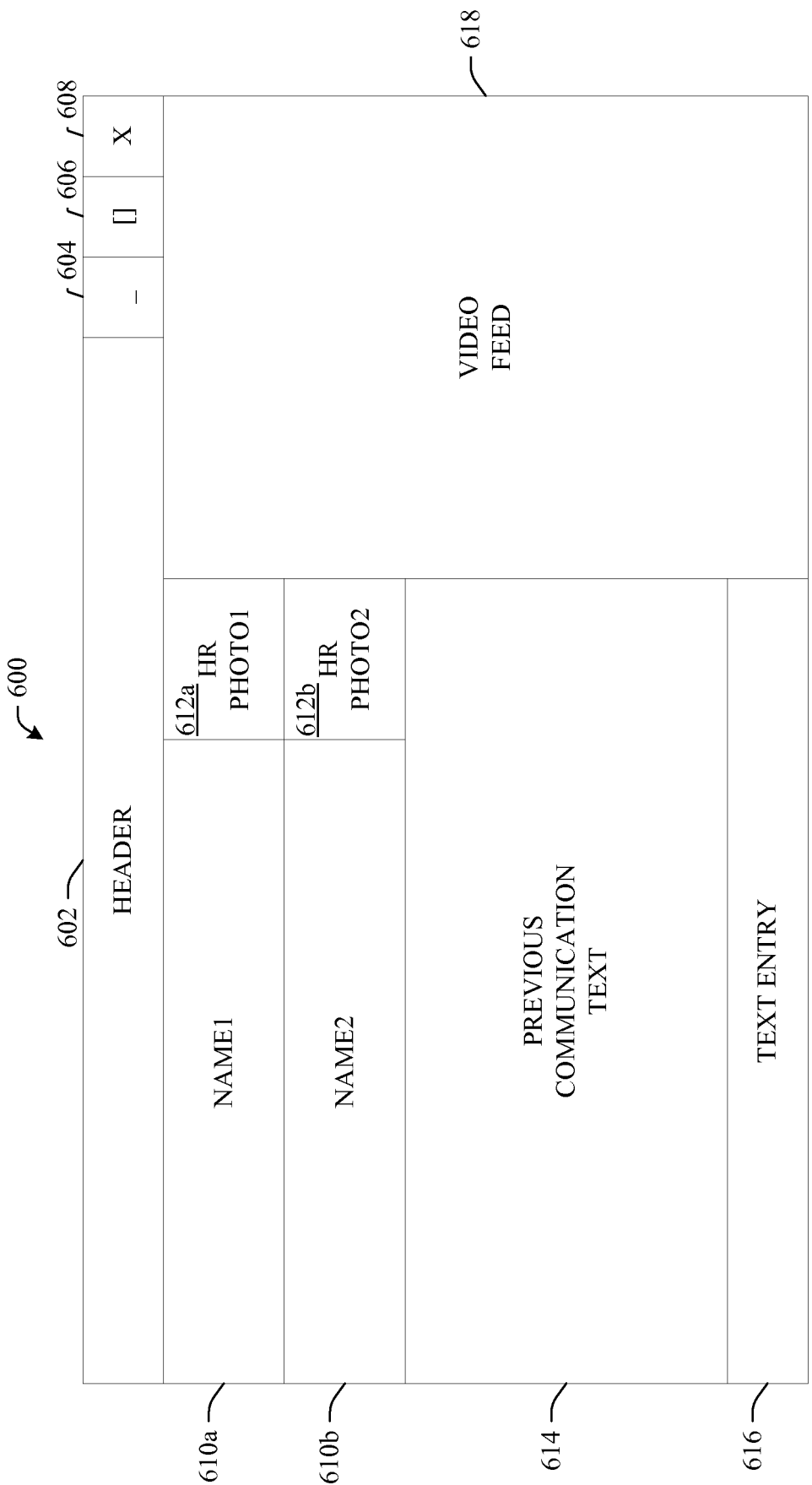
FIG. 6 illustrates a representative presentation in accordance with an aspect of the subject specification.

FIG. 6 discloses an example presentation 600 disclosed on a display component 410 of FIG. 4. This could be a display component found if the display component had a monitor with a user interface. A header 602 provides information for a communication session. For example, there can be a meeting among a board of trustees for a private school. The header can display the text 'School Name—Trustees Meeting—Date". This can allow participants to have quick access to general information about the communication session. In another embodiment, the header can provide information as to a file folder of the storage component 114 of FIG. 1 where information about the communication session is stored. In a further embodiment, the header 602 is left blank.

Command targets allow a participant to control an experience of a communication session. A minimization command target 604 allows the participant to have near-full access or full access to the display component 410 of FIG. 4. A restore down command target 606 allows the participant to have limited access to the display component 410 of FIG. 4. An exit command target 608 allows the participant to exit out of the communication session.

Identifiers of the participants can be listed on the display 610. Shown in the drawings are the names of two participants 610a and 610b. In addition to names 610a and 610b, other information can be displayed, such as status or who is the leader of the communication session. However, it is to be appreciated that a number other then two participants can be in a communication session and their names can be listed.

It is possible that at least one participant associate a high-resolution picture 612a and 612b associated with his/her name (e.g., located next to their name). A participant can engage the web camera 102 and the sending component 104, both of FIG. 1, to capture a high-resolution picture. This commonly is a personal photograph; however, this can be other personal representations, such as a company or personal logo. The high-resolution picture can be sent to a receiving component and displayed in conjunction with a participant's name (e.g., next to the participant's name). Information that the high-resolution picture is to be placed next to the participant's name can be added to the bitstream. In addition, a participant's picture can be saved in the storage component 114 of FIG. 1. For later communication sessions with the same participant, the receiving component 108 of FIG. 1 can retrieve the high-resolution picture and display it for any user interface 600 in the communication session.

For later reference in the communication session, there can be a log of pervious text 614. This can be of all text that took place during the communication session or only a partial text listing. According to one embodiment, participants can communicate using microphones. Sounds perceived by the microphone can be processed as text. In another embodiment, a participant communicates through sign language (e.g., American Sign Language) through the web camera 102 of FIG. 1. The processor component 210 of FIG. 2 can identify the signs and translate them into text. In a further embodiment, the participant can enter test through a text entry button 616. This text can also be transported in the bitstream.

Video feed 618 allows for display of images capture by the web camera 102 of FIG. 1. If the receiving component 108 of FIG. 4 that displays the presentation 600 has a web camera, then there can be multiple feeds into the video feed 618, including the feed the participant is sending. For example, if there are four participants each with web cameras, then there can be four feeds integrated into the video feed 618. The video feed can also display images that were not captured with a web camera. Furthermore, the video feed can display a single image, such as a business card that was taken in high resolution as opposed to a live video feed.

Figure 7A:
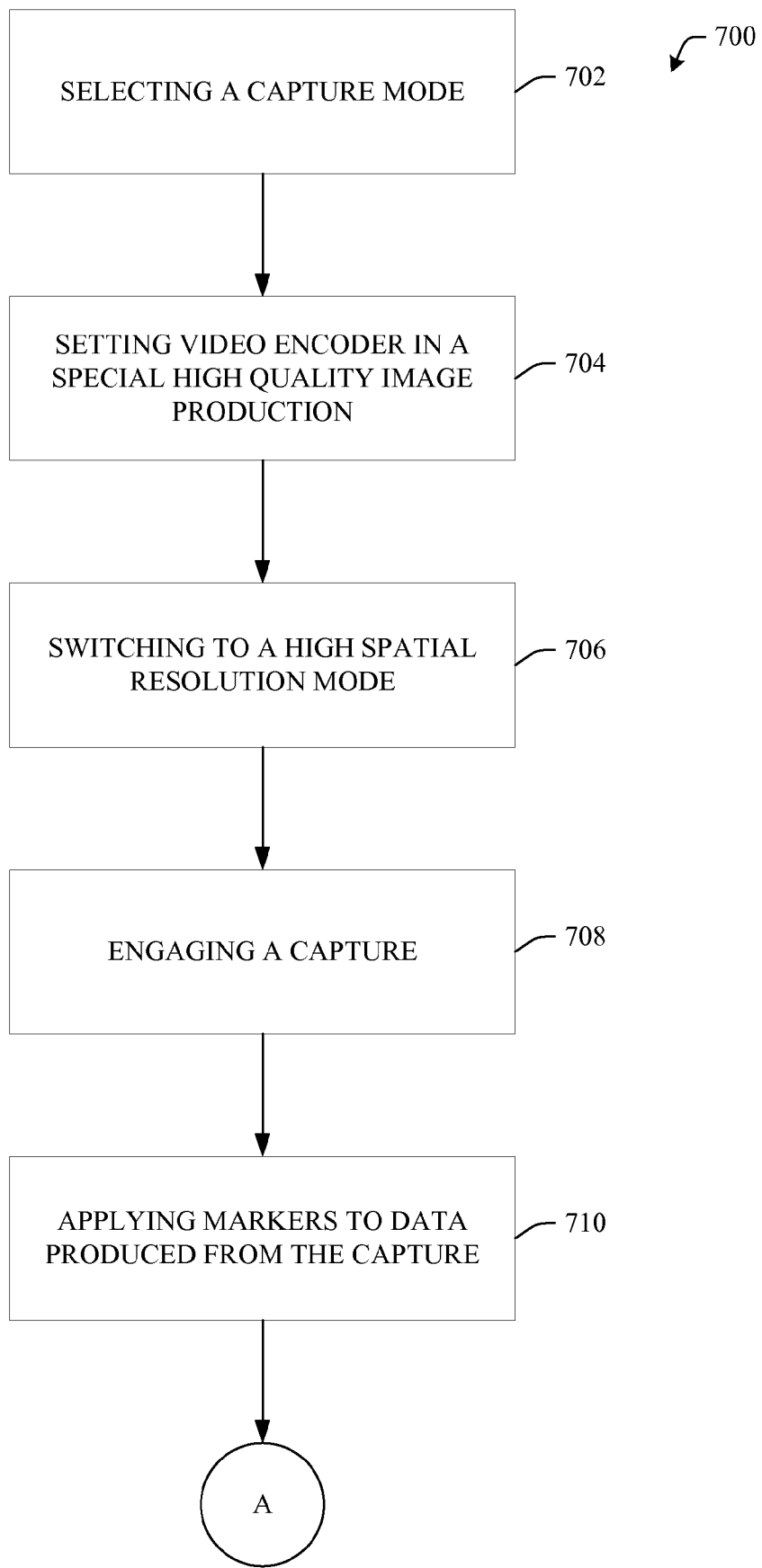
FIG. 7a illustrates a first part of a representative pixel capture in accordance with an aspect of the subject specification.
Figure 7B:
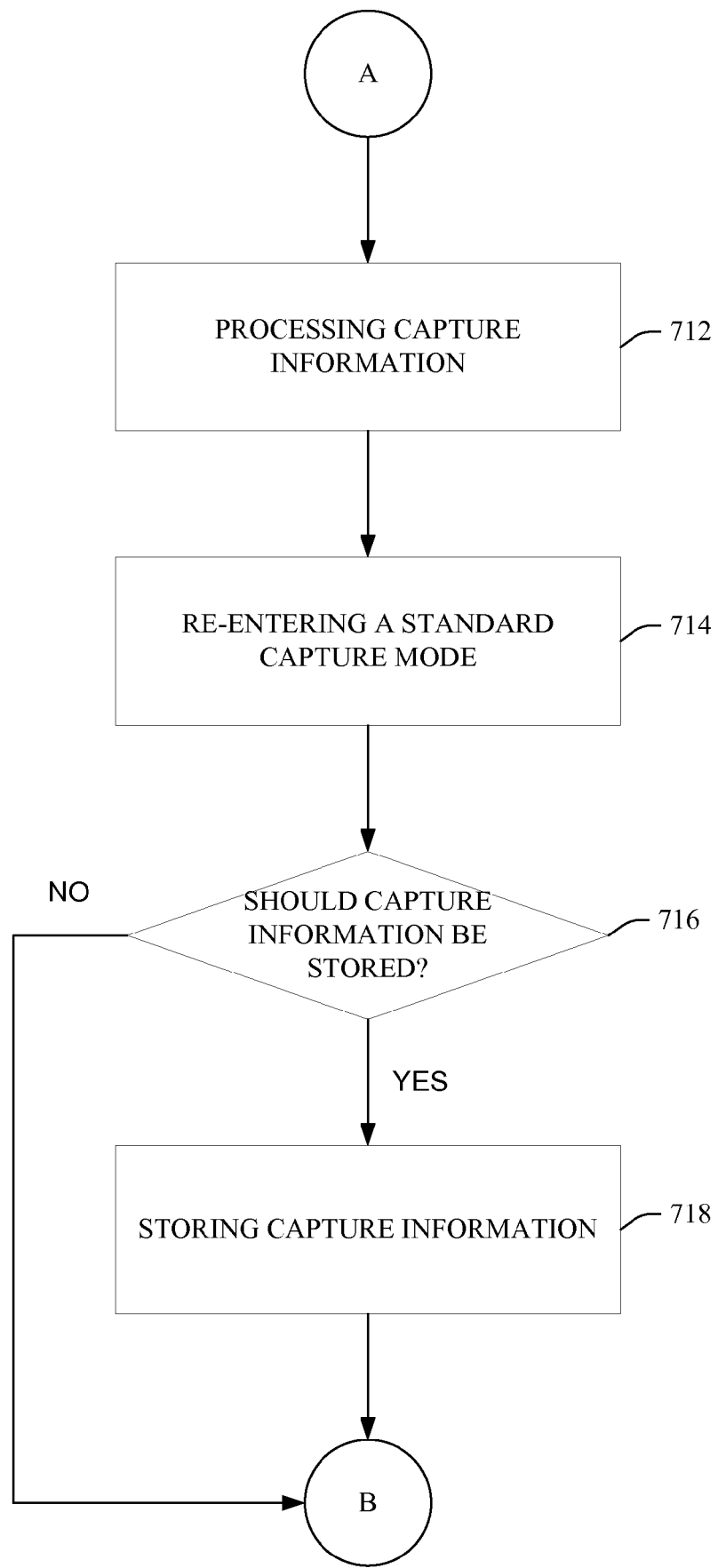
FIG. 7b illustrates a second part of a representative methodology in accordance with an aspect of the subject specification.
Figure 7C:
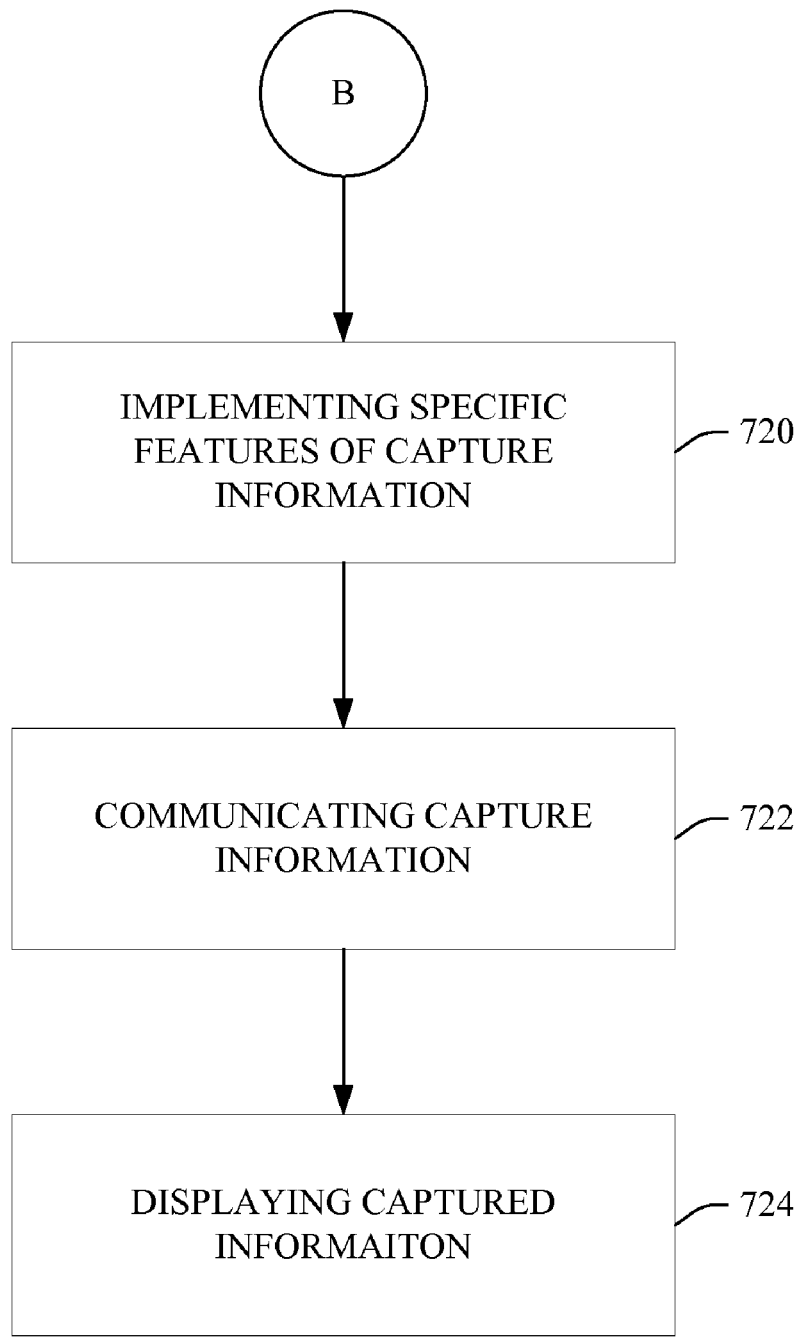
FIG. 7c illustrates a third part of a representative pixel capture in accordance with an aspect of the subject specification.

FIG. 7a through FIG. 7c discloses an example methodology implementing some aspects of the subject specification. While many disclosed details discuss a high-resolution change, it is to be appreciated that details can also be practiced for a lower resolution change. Furthermore, while there are some references to visual capture, there can be other forms of capture (e.g., electromagnetic, audio, etc.). A user at a sending component can select a capture mode 702. For example, a user can select between a video capture mode and/or a frame capture mode (e.g., capturing a single frame image). In another embodiment, the user can select between capture types (e.g., visual, audio, heat perception, etc.). A video encoder can be set to produce a changed quality image production 704. This prepares an encoder to possibly compress information in a different manner since the resolution has changed and thus captured information will be different (e.g., more detailed). Furthermore, this allows the captured information to be prepared for digital transport.

A switch can take place to set a web camera with a change in quality 706 (e.g., changing resolution). There is selecting a resolution quality in which to capture information. For example, there can be a setting to capture information at a high spatial resolution then in a standard capture. The setting can take place in a plurality of embodiments. For example, a system can recognize there is a document within a capture area and automatically capture at a higher resolution. In another embodiment, a user can switch a resolution mode manually, including between more then two resolution modes. While high spatial resolution is disclosed, it is to be appreciated that other resolutions can be used.

Once there is proper setting for a high-resolution change, there is engagement of the capture (e.g., the web camera captures desired information) 708. This is a high-resolution capture, so more system resources are typically used during the high-resolution capture. As the capture takes place, it is added to a bitstream of information with markers 710. Markers are applied to a bitstream made of captured information; markers signify a change in resolution quality of at least one portion of information. Commonly, markers are added to the start of the capture and to the end of the capture. This allows a receiving component to understand that there is a high-resolution image as well as its parameters.

Captured information is processed to determine characteristics and if any actions should take place 712. For example, it can be determined if the captured information should be stored. Processing can also include handling information that relates to super-resolution, where information from web camera movement processes to create images that are of a greater resolution (e.g., practices disclose in FIG. 5a to FIG. 5c). For example, processing can include processing captured information to create information that is of a super-resolution quality, such as actions performed by the multi-image component 216 of FIG. 2 (e.g., more then mere handling and identifying, but creating an image). Furthermore, processing can include associating captured information with an identifier during a communication session, similar to operation of the photograph component 208 of FIG. 2. Yet further, processing can include analyzing captured information to determine characteristics of captured information (e.g., determining at what resolution level information was captured).

Once a high-resolution capture is complete, a standard capture mode can be re-entered 714. However, it is possible that a third capture mode be entered. In addition, it is possible that after capturing high-resolution information a capture session end, so no mode is re-entered. A check is performed if captured high-resolution information should be saved 716. It is possible that this check take place prior to capture taking place or during a capture session. This can be an automated check or a participant can be asked if they would like to save the capture. If the high-resolution capture is to be saved, then a storage action takes place 718.

If no storage takes place, then the methodology 700 continues to event 720. Storage can take place on a sending side, a receiving side, and/or a neutral site (e.g., in a database server). Information that is of standard resolution can also be stored. In addition, there can be intelligent storage of information, where a video image can be saved as a document. For example, there can be a document captured in a video format. Storing captured information 718 can take the video image, recognize that it is a document, and store the document as a document file. In another embodiment, information is intended to be stored on the receiving side. Therefore, information is added to the bitstream signifying that there should be a storage if the information reaches a receiving component.

There can be specific implementation of features of captured information 720. For example, at action 712, there can be an association of a high-resolution image to an identifier. The association can take place and the identifier with high-resolution image can be displayed on a sending component or a separate display component 720 (e.g., the actual placement of the identifier associated with the high-resolution image upon a display component).

Captured high-resolution information is communicated to an auxiliary unit 722. Commonly, information communicates to either a router component or a receiving component. Communicating can also include compressing the information and/or encoding the information. Furthermore, this is can be transmitting captured information of both a first resolution and a second resolution during a communication session. The information is also displayed 724. Displayed information can take place in a plurality of manners, such as presenting on a monitor or printing on paper.

Figure 8:
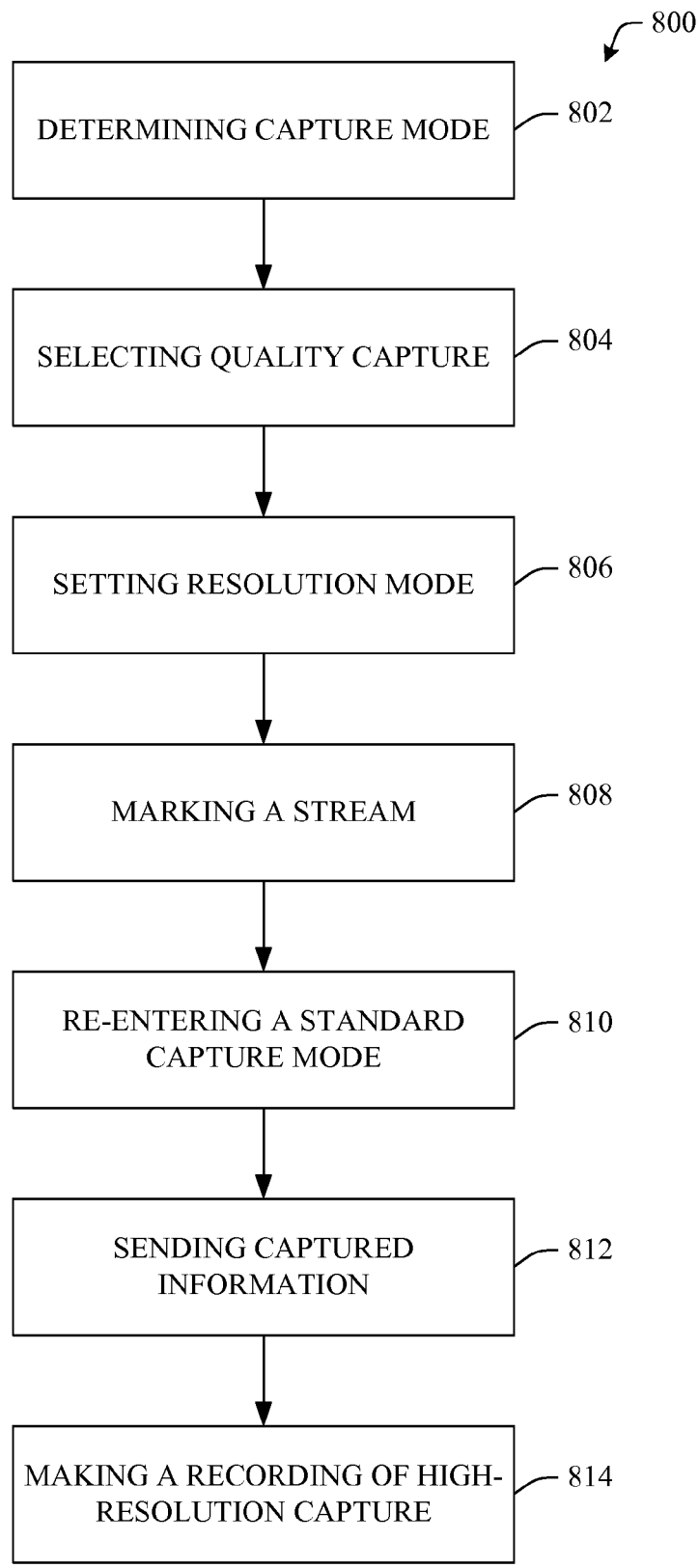
FIG. 8 illustrates a representative methodology of a sending component in accordance with an aspect of the subject specification.

FIG. 8 discloses an example methodology 800 of capturing information. While the actions disclosed are directed to capturing information of a non-standard resolution, actions could apply to standard resolution information. Initially a capture mode is determined 802. This is commonly a standard resolution mode or a high-resolution mode, thought the methodology 800 can take place at a lesser-resolution mode. Once complete, there is a selecting of an quality capture 804 (e.g., a user selects that there should be a special resolution mode). A specific resolution mode can be set 806 (e.g., the user selects which mode to use).

Once the mode is set, high-resolution begins. This is shown as automatically starting when a mode is set 806, but there can be a separate action that verifies the start. A bitstream is marked so a receiving component can determine that there is a high-resolution image 808. Common markers are a beginning marker and an ending marker.

Once a high-resolution capture is complete, a standard capture mode can be re-entered 810 (e.g., a mode that a web camera starts with when powered on). Captured high-resolution information can be transferred to an auxiliary component 812. For example, the bitstream can travel to a receiving component or a router component. Commonly information transfers to a storage component where a record of the high-resolution capture can be stored. It is to be appreciated that information can be sent to multiple locations of different types (e.g., information can both be stored and sent to a router component).

Figure 9:
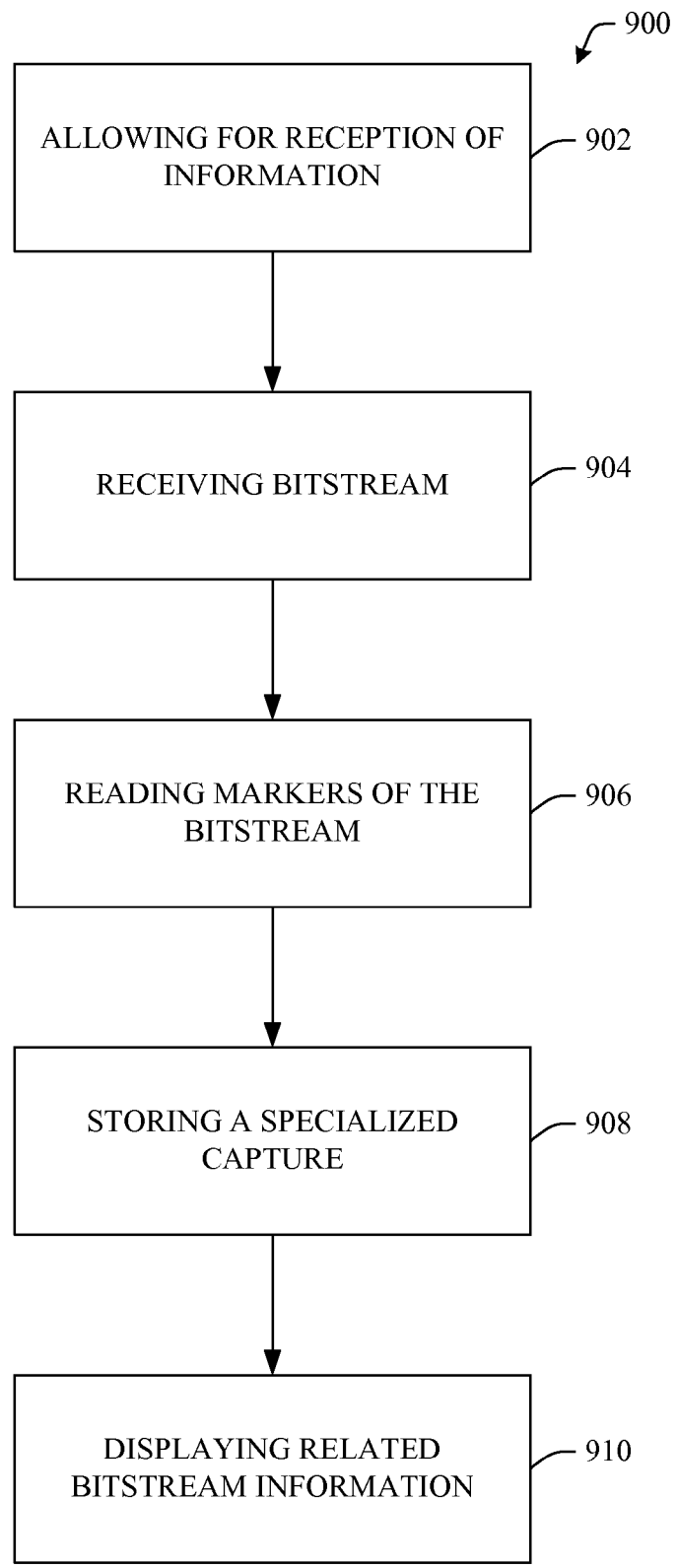
FIG. 9 illustrates a representative methodology of a receiving component in accordance with an aspect of the subject specification.

FIG. 9 discloses an example methodology 900 of receiving captured information. While the actions disclosed are directed to capturing information of a non-standard resolution, actions could apply to standard resolution information. Action 902 allows for reception of information. This can take place through a number of different embodiments. In one embodiment, a system simply needs to be turned on in order to receive information from a dedicated Internet Protocol (IP) network. In another embodiment, a receiving component can connect to the Internet. In a further embodiment, there needs to be a direct peer-to-peer initialization with a sending component.

Information that was captured can be received as a bitstream 904. High-resolution information can be inserted into a standard bitstream. Therefore, a typical bitstream has markers in it to signify when there is high-resolution information. Therefore, there is usually a reading of markers to identify where a specific capture beings and ends 906.

There can be storage of high-resolution capture information 908. While this is shown as an action 908, it can be practiced as a check similar to check 716 of FIG. 7b. Information that is of standard resolution can also be stored. In addition, there can be intelligent storage of information, where a video image can be saved as a document. For example, there can be a document captured in a video format. Storing captured information 908 can take the video image, recognize that it is a document, and store the document as a document file. Ultimately, information received though the bitstream can be displayed 910. In one embodiment, both standard resolution information and high-resolution information is displayed. There can be another check if information can be displayed at an intended resolution. Depending on this, captured information can be modified accordingly.

Figure 10:
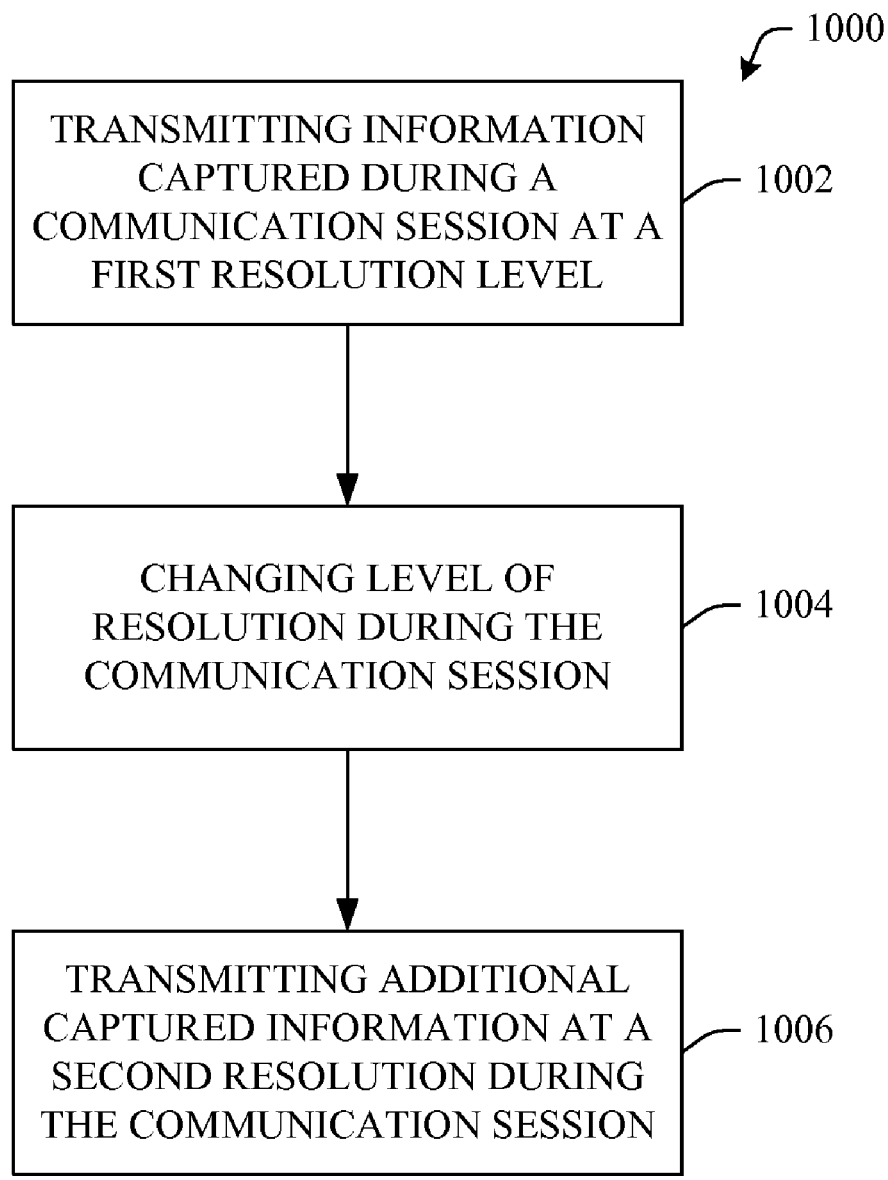
FIG. 10 illustrates a representative methodology of a multi-resolution capture session in accordance with an aspect of the subject specification.

FIG. 10 discloses an example methodology 1000 of sending information at different resolutions. There is a transmission of information captured during a communication session at a first resolution level 1002. In common operation, the first resolution level is a relatively low-resolution level. This allows for faster operation and a consumption of less resources.

A change of resolution level takes place during the communication session 1004. There can be an automatic change in resolution or a manual change. Typically, the change is to a higher resolution level. There is a transmission of additional captured information at a second resolution during the communication session 1006. Typically, this is of a higher resolution level then information transmitted during event 1002. Actions disclosed in the methodology 1000 can integrate with actions disclosed in other methodologies. For example, action 1006 can integrate with applying markers to a bitstream 808 of FIG. 8. Furthermore, actions 702-720 of FIG. 7 can operate in line with the methodology 1000.

Figure 11:
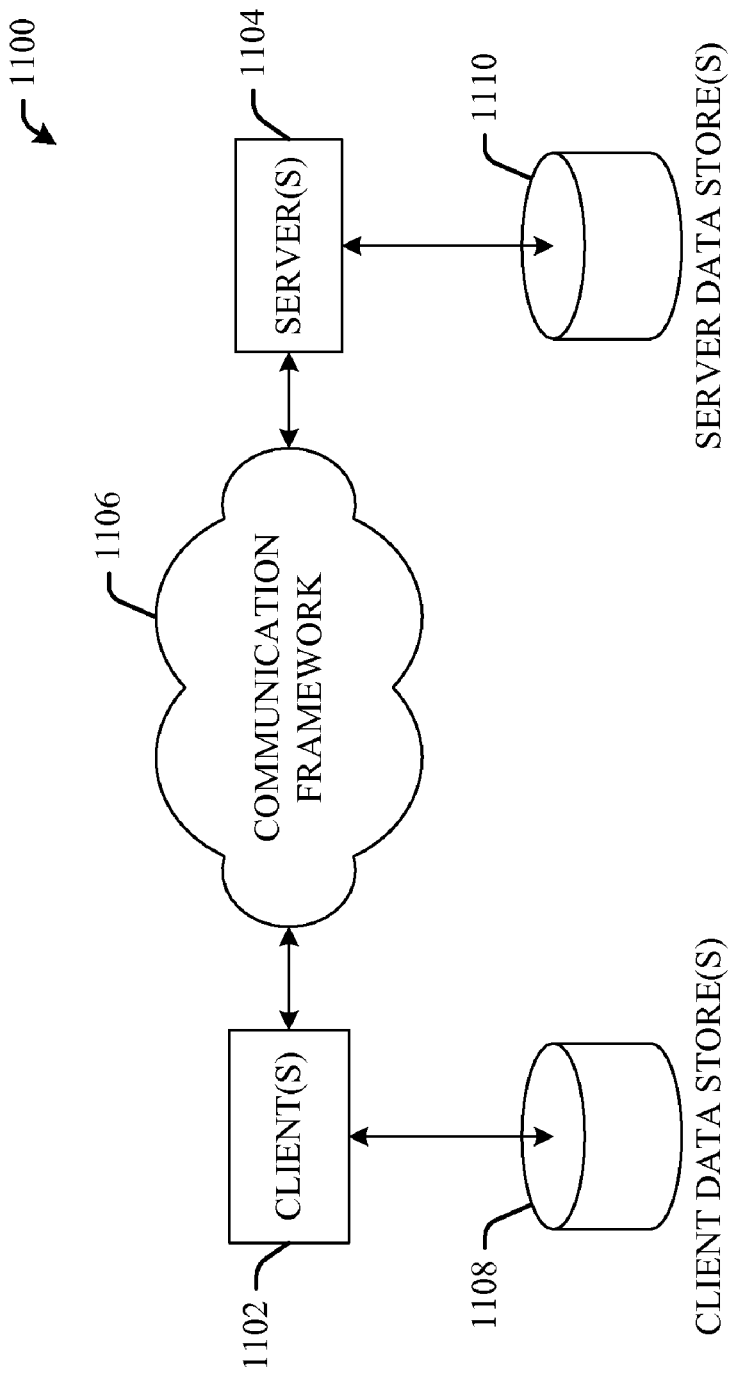
FIG. 11 illustrates a representative schematic block diagram of a computing environment in accordance with an aspect of the subject specification.

Referring now to FIG. 11, there is illustrated a schematic block diagram of a computing environment 1100 in accordance with the subject specification. The system 1100 includes one or more client(s) 1102. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

Figure 12:
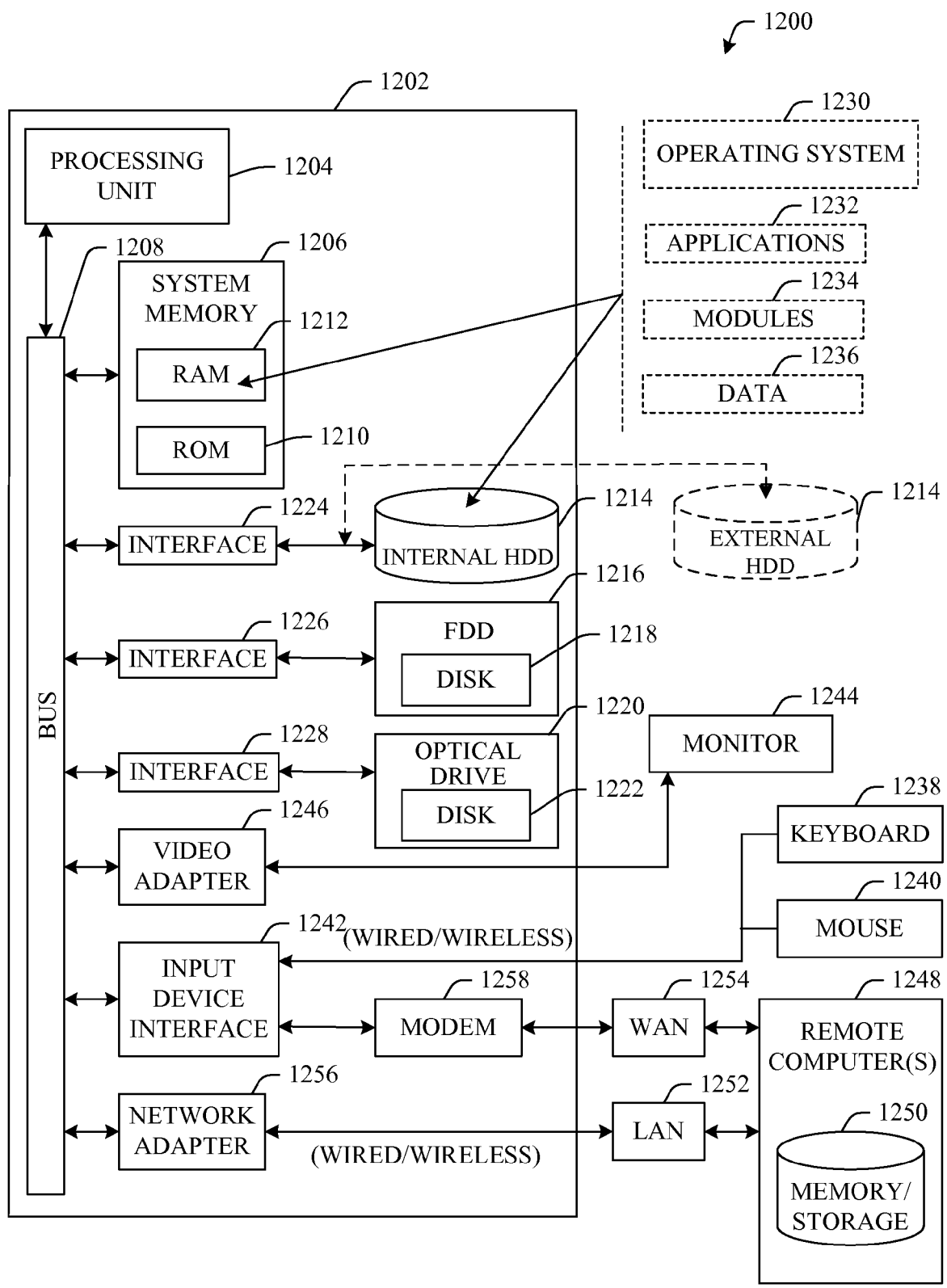
FIG. 12 illustrates a representative block diagram of a computer operable to execute in accordance with an aspect of the subject specification.

Referring now to FIG. 12, there is illustrated a block diagram of a computer operable to execute the disclosed architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A web camera system, comprising:
   a web camera;
   a resolution mode component that can change level of resolution capture of the web camera during a communication session for live conferencing, wherein the resolution mode component can enable the web camera to capture information initially in a first level of resolution, change to capture a document in a second level of resolution, and then return to capture information in the first level of resolution;
   a marking component that adds marks after a portion of an emitted bitstream containing information that is captured in a first resolution quality to signify at least a beginning of information that is captured in a second resolution quality; and
   a processor component that creates an intelligent record of information captured by the web camera.

2. The system of claim 1, wherein level of resolution capture is changed for audio capture.

3. The system of claim 1, wherein level of resolution capture is changed for visual capture.

4. The system of claim 3, further comprising a multi-image component that creates super-resolution images from information obtained by the web camera.

5. The system of claim 3, further comprising a photograph component that associates information captured by the web camera with an identifier.

6. The system of claim 5, further comprising an identifier component that launches a mode at the start of the communication session to obtain associated information.

7. The system of claim 1, further comprising a transfer component that emits information captured by the web camera.

8. The system of claim 1, wherein the resolution mode component automatically switches level of resolution for the web camera to obtain information.

9. A method, comprising:
   transmitting information captured during a communication session at a first resolution level;
   changing, by a processor, level of resolution capture during the communication session for live conferencing;
   transmitting additional captured information at a second resolution during the communication session, the additional captured information comprising a high-resolution capture of a document;
   applying markers to a video bitstream made of captured information, wherein the markers signify a change in level of resolution of at least one portion of information; and
   creating an intelligent copy of captured information at the second resolution.

10. The method of claim 9, further comprising associating information captured during a communication session with an identifier.

11. The method of claim 9, further comprising processing captured information to create information that is of a super-resolution quality.

12. The method of claim 9, further comprising entering a capture mode in a first resolution quality automatically after obtaining information in a first resolution quality and switching to a capture mode in a second resolution quality.

* * * * *